US010450975B2

(12) United States Patent
Touchette et al.

(10) Patent No.: US 10,450,975 B2
(45) Date of Patent: Oct. 22, 2019

(54) SKIP-FIRE FUEL INJECTION SYSTEM AND METHOD

(71) Applicant: Westport Power Inc., Vancouver (CA)

(72) Inventors: Alain M. J. Touchette, Vancouver (CA); Jeffrey J. Thompson, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 410 days.

(21) Appl. No.: 14/738,832

(22) Filed: Jun. 13, 2015

(65) Prior Publication Data
US 2016/0017824 A1 Jan. 21, 2016

Related U.S. Application Data

(63) Continuation of application No. PCT/CA2013/050958, filed on Dec. 12, 2013.

(30) Foreign Application Priority Data

Dec. 14, 2012 (CA) ...................................... 2798599

(51) Int. Cl.
F02D 41/00 (2006.01)
F02D 41/30 (2006.01)
(Continued)

(52) U.S. Cl.
CPC ......... *F02D 41/0087* (2013.01); *F02D 17/02* (2013.01); *F02D 41/0027* (2013.01);
(Continued)

(58) Field of Classification Search
CPC .. F02D 17/02; F02D 41/0027; F02D 41/0087; F02D 41/3058; F02D 41/403; F02D 41/406; Y02T 10/44
(Continued)

(56) References Cited

U.S. PATENT DOCUMENTS 5,450,829 A 9/1995 Beck
5,477,830 A * 12/1995 Beck ................. F02M 35/10216
123/470
(Continued)

FOREIGN PATENT DOCUMENTS

CN 1078662 C 1/2002
CN 101421500 A 4/2009
(Continued)

OTHER PUBLICATIONS

International Search Report of the International Searching Authority dated Feb. 20, 2014, in connection with International Application No. PCT/CA2013/050958.
(Continued)

*Primary Examiner* — Carl C Staubach
(74) *Attorney, Agent, or Firm* — Carie C. Mager

(57) ABSTRACT

A cycle-by-cycle skip-fire fuel-injection technique for pilot-ignited engines involve skip-firing selected combustion chambers when a low load condition is determined and modulating the fuel delivery to maintain the requisite engine power, while reducing pilot fuel quantity to a predetermined minimum. Overall pilot fuel consumption is thereby reduced.

19 Claims, 7 Drawing Sheets

(51) Int. Cl.
*F02D 41/40* (2006.01)
*F02D 17/02* (2006.01)
*F02B 75/18* (2006.01)

(52) U.S. Cl.
CPC ....... *F02D 41/3058* (2013.01); *F02D 41/403* (2013.01); *F02D 41/406* (2013.01); *F02B 2075/1824* (2013.01); *Y02T 10/44* (2013.01)

(58) Field of Classification Search
USPC .......................................................... 123/481
See application file for complete search history.

(56) References Cited

U.S. PATENT DOCUMENTS

| | | | |
|---|---|---|---|
| 5,520,161 A * | 5/1996 | Klopp | F02D 41/0072 |
| | | | 123/568.24 |
| 5,553,575 A | 9/1996 | Beck et al. | |
| 5,826,563 A * | 10/1998 | Patel | F02D 41/0087 |
| | | | 123/198 F |
| 6,405,705 B1 | 6/2002 | Dunsworth et al. | |
| 6,408,625 B1 * | 6/2002 | Woon | F02D 17/02 |
| | | | 123/198 F |
| 6,823,835 B2 | 11/2004 | Dunsworth et al. | |
| 6,886,525 B1 | 5/2005 | Hayes, Jr. et al. | |
| 8,091,536 B2 | 1/2012 | Munshi et al. | |
| 8,131,447 B2 * | 3/2012 | Tripathi | F02D 41/0087 |
| | | | 123/198 F |
| 8,136,497 B2 | 3/2012 | Gibson et al. | |
| 2004/0103873 A1 * | 6/2004 | Pott | F02D 41/3836 |
| | | | 123/299 |
| 2005/0274352 A1 * | 12/2005 | Canale | F02D 35/023 |
| | | | 123/299 |
| 2007/0215097 A1 * | 9/2007 | Watanabe | F02D 41/0087 |
| | | | 123/299 |
| 2009/0012698 A1 * | 1/2009 | Shinagawa | F02D 13/0215 |
| | | | 701/103 |
| 2010/0043744 A1 * | 2/2010 | Suzuki | F02B 77/08 |
| | | | 123/260 |
| 2010/0063710 A1 * | 3/2010 | Asai | F02D 17/02 |
| | | | 701/103 |
| 2011/0137543 A1 | 6/2011 | Gibson et al. | |
| 2011/0202262 A1 | 8/2011 | Gibson et al. | |
| 2011/0251773 A1 | 10/2011 | Sahandiesfanjani et al. | |
| 2011/0253113 A1 * | 10/2011 | Roth | F02D 41/008 |
| | | | 123/568.12 |
| 2012/0325180 A1 * | 12/2012 | Montgomery | F02D 41/3094 |
| | | | 123/299 |
| 2013/0019588 A1 * | 1/2013 | Richardson | F01N 3/106 |
| | | | 60/274 |
| 2013/0311067 A1 * | 11/2013 | Stockner | F02D 19/027 |
| | | | 701/104 |
| 2014/0014062 A1 * | 1/2014 | Yacoub | F02B 17/005 |
| | | | 123/295 |
| 2016/0032859 A1 * | 2/2016 | Klingbeil | F02D 41/0087 |
| | | | 123/350 |

FOREIGN PATENT DOCUMENTS

| | | |
|---|---|---|
| EP | 1225321 A2 | 7/2002 |
| WO | 9530085 A1 | 11/1995 |
| WO | 2006017870 A2 | 2/2006 |
| WO | 2010006321 A2 | 1/2010 |
| WO | 2012024653 A2 | 2/2012 |

OTHER PUBLICATIONS

International Preliminary Report on Patentability dated Jun. 16, 2015, in connection with International Application No. PCT/CA2013/050958.

English translation of Search Report and First Office Action dated Dec. 28, 2016 in connection with the corresponding Chinese Patent Application No. 201380071024.X.

First Office Action dated Dec. 28, 2016 in connection with the corresponding Chinese Patent Application No. 201380071024.X.

Supplementary European Search Report dated Dec. 16, 2016, in connection with the corresponding European Patent Application No. 13862956.3.

* cited by examiner

SKIP-FIRE FUEL INJECTION SYSTEM AND METHOD

CROSS-REFERENCE TO RELATED APPLICATIONS

This application is a continuation of International Application No. PCT/CA2013/050958 having a filing date of Dec. 12, 2013, entitled "Skip-Fire Fuel Injection System and Method", which claimed priority benefits from Canadian patent application No. 2,798,599 filed on Dec. 14, 2012. The '958 international application is hereby incorporated by reference in its entirety.

FIELD OF THE INVENTION

The present disclosure relates to skip-fire engine technologies. More specifically, the present disclosure relates to skip-fire fuel-injection engine technologies for engines fueled with two different fuels.

BACKGROUND OF THE INVENTION

Many related art engine systems utilize skip-firing modes or fueling modes. These skip-firing modes include various skip-firing patterns and various fueling strategies, but they do not provide a solution for increasing the diesel substitution factor (DSF), that is, decreasing the amount of diesel fuel that is consumed and replacing it with another fuel to provide the desired amount of total energy to fulfill the demanded engine load. Because diesel fuel is readily available, and its ignition properties are well known, diesel fuel is often used as a pilot fuel for triggering combustion of other fuels that are less readily ignited, such as natural gas or other gaseous fuels. However, other substances, such as dimethyl ether or kerosene, could be substituted as the pilot fuel. Accordingly, references to "diesel" and "DSF" will be understood to include fuels that can be employed as pilot fuels to trigger the combustion of a different fuel, which is employed as the main fuel. On average, the main fuel constitutes the majority of the fuel that is consumed by the engine.

U.S. Pat. No. 5,553,575 relates to a "gas-fueled unthrottled internal combustion engine" having an excess air ratio (lambda) that is optimized by selecting automatically and continuously the optimum fraction of combustion chambers firing (OFF) as a function of engine operating parameters. Further lambda adjustment is performed by suitable control of exhaust gas recirculation (EGR), ignition timing, and/or turbo air bypass (TAB). More specifically, the '575 patent discloses a dual-fuel system which can be fueled with port-injected natural gas and an ignition assist system that can consist of a spark plug or a fuel injector for introducing pilot quantities of diesel fuel directly into the combustion chamber. Port-injected natural gas is injected into the intake port, upstream of the engine intake valve so that the natural gas mixes with the intake air during the engine's intake and compression stroke. If the mixture of natural gas and air detonates prematurely during the compression stroke, this premature detonation is commonly referred to as "engine knock" and this can result in significant damage to the engine. To reduce the risk of engine knock, engines normally reduce the compression ratio and/or reduce the amount of natural gas and increase the amount of diesel fuel that is consumed by the engine. Compared to a conventional diesel engine, in which the fuel is injected directly into the combustion chamber late in the compression stroke, forming a stratified charge, fuel that is port-injected has more time to mix with the air, forming a more homogeneous mixture. The '575 patent also discloses that, for port-injected natural gas, it is important to maintain lambda within a narrow range for the efficient combustion of the homogeneous mixture and to avoid misfiring and excessive production of NOx. Accordingly, the '575 patent is directed to a method for controlling lambda; it is not directed towards a method of reducing the amount of diesel fuel consumed.

Like the '575 patent, U.S. Pat. No. 5,477,830 also relates to an internal combustion engine with natural gas that is injected into the intake air system, upstream of the combustion chamber intake valves. However, the '830 patent is specifically directed to an electronic fuel injection system for the precise distribution of natural gas into each cylinder for engines that use a shared intake port for a pair of cylinders. Duration and timing of the fuel injection pulse and other injection strategies, such as a skip-fire operation, are controlled and enabled. However, like the '575 patent, because the '830 patent is directed to a dual fuel engine that teaches fumigating the natural gas to form a homogeneous mixture and controlling the air-fuel mixture (lambda); its objective is not increasing the DSF.

With an engine that injects a main fuel into the intake air system, and injects a second fuel, such as diesel fuel directly into the combustion chamber, there are times when the DSF is decreased (not increased). For example, when the amount of port injected fuel is limited to prevent, or at least reduce, engine knock, the amount of injected diesel fuel is increased to satisfy the total amount of energy needed for the commanded engine load and speed condition. With engines such as those disclosed in the '575 patent and the '830 patent it is common under some normal operating conditions for the fuel delivered to the engine to comprise between 50% and 100% diesel fuel.

Skip-fire techniques are utilized by some conventional gasoline or diesel mono-fueled engines, but for engines that are fueled with only one fuel, DSF is not applicable. Rather, there are various other reasons for using skip-fire techniques combined with different fuel injection strategies, for example, to reduce smoke emissions, to increase boost pressure, and to adjust air to fuel ratio.

U.S. Pat. No. 5,826,563 relates to a high horsepower locomotive diesel engine that is operated in a skip-firing mode, wherein the engine includes a plurality of individually controllable, fuel-injected cylinders. The system senses that the engine is operating in a low horsepower mode and has a low fuel demand. The pattern selected for firing the cylinders is arranged such that all cylinders of the engine are fired within a preselected number of crankshaft rotations. The system also senses the engine air-fuel ratio and adjusts the pattern of cylinders being fired so as to maintain exhaust emissions below a preselected level. Additionally, the pattern of fired cylinders can be adjusted to maintain engine operating temperature and as a function of engine speed. Accordingly, the '563 patent relates to skip-fire for the purpose of adjusting the air to fuel ratio and adjusting the total fuel limit value for reducing smoke emissions in locomotive diesel systems.

U.S. Pat. No. 6,405,705 and continuation-in-part U.S. Pat. No. 6,823,835 both relate to a diesel engine having a plurality of individually controllable fuel-injected cylinders that is operated in a skip-firing mode to reduce smoke emissions during low power operation. The system senses certain identified engine operating parameters and, when these parameters exceed predetermined thresholds for a predetermined time, skip-firing is implemented. Upon implementation of skip-firing, the engine timing angle is reset by a fixed angle and a multiplication factor is included in the speed loop integrator to ensure that the appropriate fuel volume value is injected into each cylinder immediately upon initiation of skip-firing. The '705 patent relates to skip-fire in conjunction with adjusting the air to fuel ratio and adjusting the total fuel limit value for reducing smoke emissions in locomotive engine systems, and the '835 patent relates to adding fuel from skipped cylinders into fueled cylinders for adjusting air to fuel ratio in order to maintain performance parameters.

U.S. Pat. No. 6,408,625 relates to an electric power generation system which includes a back-up electric power generator driven by a four-cycle internal combustion engine. The engine includes a compressor along an intake pathway to deliver pressurized air to the cylinders and a turbine along an exhaust pathway to power the compressor when driven by exhaust discharged from the cylinders. The engine is prepared to accept a generator load by increasing boost pressure provided by the compressor. This increase in boost pressure is accomplished by skip-firing the cylinders in a selected pattern, thereby retarding ignition timing for the cylinders, or by using a combination of these techniques. Accordingly, the '625 patent relates to a skip-firing technique for increasing boost pressure.

U.S. Pat. No. 8,136,497 involves a method for improving starting of an engine that can be repeatedly stopped and started to improve fuel economy. In one embodiment, the method involves using skip-fire when the engine is idling to reduce fuel consumption and prevent the engine speed from overshooting the desired idle speed. Another embodiment is disclosed whereby skip-fire is employed for torque control.

U.S. Patent Application Publication No. 2011/0253113 relates to an engine that is configured with an exhaust gas recirculation (EGR) system, The EGR system comprises exhaust manifolds from one or more cylinders being connected to an intake system, such cylinders being referred to as donor cylinders. These donor cylinders are the cylinders from which exhaust gas is recirculated to the intake. For an engine which uses skip-fire, the '113 publication relates to various methods and systems for operating an internal combustion engine that has one or more donor cylinders and one or more non-donor cylinders. Accordingly, depending upon the engine operating conditions, the '113 publication is directed to methods for choosing whether to skip either donor cylinders or non-donor cylinders when skip-fire is commanded. For example, during an EGR cooler heating mode, the system operates at least one of the donor cylinders at a cylinder load that is sufficient to increase an exhaust temperature for regenerating an EGR cooler and operates at least one of the non-donor cylinders in a low-fuel or no-fuel mode.

U.S. Pat. No. 8,131,447 relates to a variety of methods and arrangements for improving fuel efficiency of internal combustion engines, including selectively skipping combustion events so that other working cycles can operate at a better thermodynamic efficiency. A controller is used to dynamically determine the chamber firings required to provide the engine torque based on the engine's current operational state and conditions. The chamber firings can be sequenced in real time or in near real time in a manner that helps reduce undesirable vibrations of the engine.

While these background examples may relate to skip-fire techniques in association with a variety of technical problems, they fail to disclose an engine that injects two different fuels directly into the combustion chamber, or methods for increasing the amount of one fuel that is substituted for the other fuel. More specifically, when diesel fuel is employed as a pilot fuel, none of these background examples discloses increasing DSF and reducing overall diesel pilot fuel consumption in direct-injection compression-ignition engine systems.

SUMMARY OF THE INVENTION

The present disclosure generally involves systems and methods that provide many beneficial features and advantages over the prior art, including, significantly reducing overall pilot fuel consumption for engines that use a pilot fuel to trigger the ignition of a different fuel that serves as the main fuel, especially for compression-ignition engine systems. The disclosed systems and methods also involve a skip-fire fuel-injection strategy that increases the pilot fuel substitution factor, referred to herein as the DSF. Compared to engines that inject fuel into the intake port or elsewhere upstream from the intake valve, when engines inject fuel into the combustion chambers either via a pre-chamber or directly, the fuel must be injected at higher pressures to overcome the in-cylinder pressure that increases during the compression stroke.

High-pressure direct-injection (HPDI) engine systems denote engine systems that introduce at least some of the main fuel and the pilot fuel into a combustion chamber during the compression stroke or near the beginning of the power stroke (this injection timing being referred to herein as "late cycle injection timing"). In an HPDI engine system, the timing for injecting the fuel into the combustion chamber is determined based on the desired timing for ignition of the fuel, with the fuel burning in a stratified combustion mode rather than a pre-mixed combustion mode. When a fuel is injected directly into a combustion chamber there is normally a time delay, referred to as the "ignition delay", between the timing for start of injection and the timing for start of ignition. Accordingly, in an HPDI engine system, the timing for start of injection can be determined based upon the timing for start of ignition, minus the ignition delay associated with detected engine operating conditions so that the fuel ignites at the desired time, thereby preventing premature detonation. For an HPDI engine system, both fuels can be introduced into the combustion chamber after the associated intake valve closes, whether this is accomplished by way of being injected directly into the combustion chamber or indirectly injected via a pre-chamber. Engines that use port injection can be "knock limited," meaning that a limit exists on the amount of fuel that can be safely port-injected into the intake air system upstream from the combustion chamber intake valve. Such port-injected engines use an increased amount of directly-injected pilot fuel to constitute the total amount of fuel that is needed on an energy basis. However, for HPDI engine systems, reducing the amount of pilot fuel to that which is needed for ignition of the main fuel is possible since late cycle injection timing lowers the danger engine knock as the fuel is not introduced into the combustion chamber until the intended time for its ignition. A requisite total fueling is mandated by a requisite engine power for a given engine operating condition.

The present method comprises a skip-fire strategy, including a cycle-by-cycle skip-firing pattern. Regardless of whether an engine is a 2-stroke engine or a 4-stroke engine, a power stroke is associated with each cycle. By controlling whether fuel is introduced into a combustion chamber, the method involves selectively skipping the firing in each cylinder on a cycle-by-cycle basis. In preferred embodiments, the skipped cylinders are selected in a pattern such that these skipped cylinders reduce the formation of harmonic frequency vibrations in the engine. In addition, the cycle-by-cycle skip-firing pattern further comprises a switching period during a given cycle which provides sufficient time for determining which cylinders to skip for a subsequent cycle.

In addition, the present system and method involve a skip-fire technique combined with a fuel-injection strategy for modulating the fuel delivery. At low engine loads, as the total fuel requirement decreases, a limit exists as to how much the pilot fuel quantity can be reduced while also ensuring stable combustion. As the pulse width of a pilot fuel injection event decreases, the potential for variability is higher in the amount of pilot fuel that is injected as other variables exist in addition to the variability in the pulse width, such as the fuel pressure, cylinder pressure, injector-to-injector differences, and cylinder-to-cylinder differences. When the pulse width is very short, the cycle-to-cycle differences in the amount of fuel injected represent a larger fraction of the total fueling compared to the cycle-cycle differences in the amount of fuel injected when the commanded pilot fuel quantity is larger. Accordingly, at low loads, to improve combustion stability, setting a lower limit on the amount of pilot fuel that is commanded is preferable. For engines that do set a lower limit on the amount of pilot fuel, by using a skip-fire technique, the overall amount of pilot fuel that is consumed in the firing cylinders is lower than engines that do not employ a skip-fire technique. It is noteworthy that the DSF can be increased in part because the amount of pilot fuel is determined mainly by the amount needed for acting as a pilot fuel and achieving stable combustion. Unlike prior engines, the amount of pilot fuel is not determined by the energy needed to satisfy the engine load.

The present method of skip-firing an engine system wherein the engine system has a plurality of combustion chambers, a fuel-injection system for delivering fuel to each combustion chamber, and is operated with a main fuel and a pilot fuel, comprises: detecting whether the engine is experiencing a predetermined low load condition for applying a skip-fire injection mode; when the predetermined low load condition is detected, determining and selecting at least one combustion chamber of the plurality of combustion chambers designated for skip-firing during a next cycle; skip-firing the selected at least one combustion chamber for a given duration whereby pilot fuel substitution is increased and overall pilot fuel consumption is reduced; determining whether the engine continues experiencing the low load condition during the given duration; and, if so, repeating determining and selecting at least one combustion chamber of the plurality of combustion chambers to skip-fire during the next cycle, and if not, returning the plurality of combustion chambers to a normal injection mode.

The disclosed method also comprises at least one of: selecting a different one or more combustion chambers for skip-firing in the following cycle; continuing to skip-fire the same selected combustion chamber(s) for a predetermined number of cycles or for a predetermined time duration, or when a plurality of combustion chambers are selected; continuing to skip-fire a select one or more of the same selected combustion chambers in addition to skip-firing a select one or more of different combustion chambers.

After completing the predetermined number of cycles or completing the predetermined time duration, the method further comprises determining whether the engine continues to experience the low load condition; and, if so, repeat determining and selecting at least one combustion chamber of the plurality of combustion chambers to skip-fire during the next cycle, and if not, ending the skip-fire mode and returning the plurality of combustion chambers to a normal injection mode.

The present skip-fire fuel-injection engine system generally comprises an engine system, such as a compression-ignition engine system, for example, a diesel engine system, modified and operable for fueling with a main fuel and a pilot fuel. The engine system has a plurality of combustion chambers and a fuel injection system, preferably for separate and independent injection of the pilot fuel and the main fuel. In preferred embodiments, the pilot fuel can be diesel fuel and the main fuel can be natural gas, or other suitable gaseous fuels, such as methane, propane, hydrogen, and mixtures thereof. The engine system further comprises a feedback and control system in electronic communication with the fuel injection system. The feedback and control system is adapted to: determine whether the engine is experiencing a low load condition for applying a skip-fire injection mode; determine and select at least one combustion chamber of the plurality of combustion chambers designated for skip-firing during a next cycle.

The present method of fabricating a skip-fire engine system generally comprises providing an engine system that employs a pilot fuel to trigger the ignition of a main fuel, or modifying a diesel engine system for fueling with a main fuel that uses a pilot fuel to trigger ignition of the main fuel. The engine system has a plurality of combustion chambers and a fuel injection system for introducing the pilot fuel and the main fuel into each one of the respective combustion chambers. In preferred embodiments the fuel injection system injects the pilot fuel and the main fuel directly into the combustion chamber. However, the method could also comprise providing a pre-chamber into which one or both fuels are injected. In either case, the common feature is that late cycle injection is enabled after the intake valve is closed. The present fabrication method also comprises providing a feedback and control system in electronic communication with the fuel injection system the diesel engine system. The feedback and control system is adapted to: determine whether the engine is experiencing a low load condition for applying a skip-fire injection mode; determine and select at least one combustion chamber of the plurality of combustion chambers designated for skip-firing during a next cycle; skip-fire the selected at least one combustion chamber for a given duration; determine whether the engine continues experiencing the low load condition during the given duration; and, if so, repeat determining and selecting at least one combustion chamber of the plurality of combustion chambers to skip-fire during the next cycle, and if not, return the plurality of combustion chambers to a normal injection mode. A normal injection mode is defined herein to be a mode in which pilot fuel and main fuel are delivered to each of the engine's respective combustion chambers at a respective timing so that each of the engine's pistons is doing substantially the same amount of work for a given operating condition.

Figure 1:
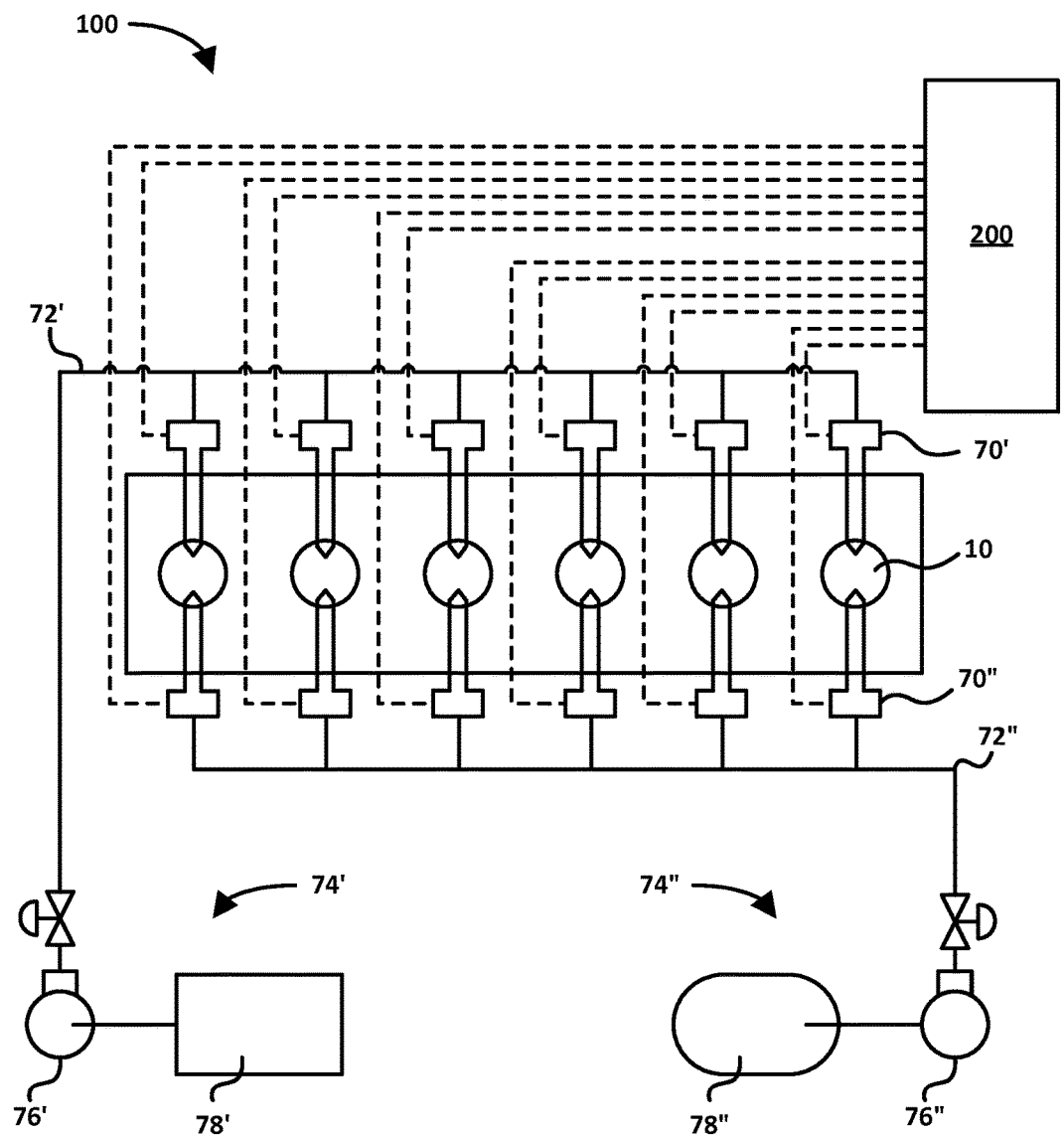
FIG. 1 is a schematic diagram illustrating an engine system with a plurality of cylinders, with a fuel injector for injecting a pilot fuel and a main fuel into each combustion chamber.

Corresponding reference characters indicate corresponding components. Elements in the figures are illustrated for simplicity and clarity and have not necessarily been drawn to scale. For example, the dimensions of some of the elements in the figures can be emphasized relative to other elements for facilitating understanding of the various presently disclosed embodiments. Also, common, but well-understood, elements that are useful or necessary in commercially feasible embodiments are often not depicted in order to facilitate a less obstructed view of the various embodiments.

DETAILED DESCRIPTION OF ILLUSTRATIVE EMBODIMENT(S)

Figure 3:
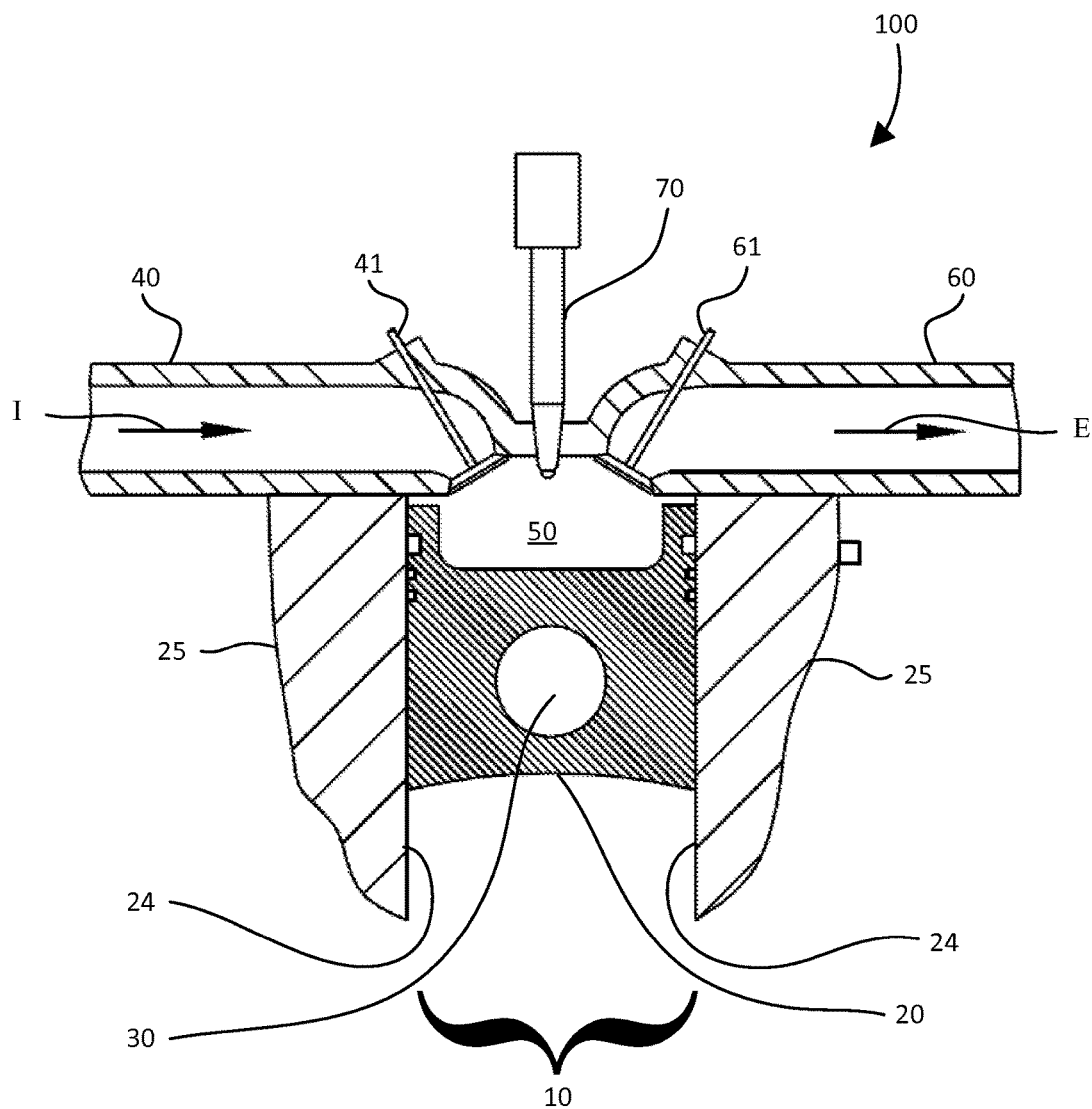
FIG. 3 is a cross-sectional view of one cylinder, illustrating a portion of an HPDI engine system suitable for use in a skip-fire operation mode.

Referring to FIG. 1, a schematic diagram illustrates engine system 100, such as a compression-ignition engine system, for example, a diesel engine system. In this example, the engine has six cylinders 10 that each has two associated fuel injectors mounted to deliver fuel into the combustion chamber defined by each cylinder. Pilot fuel injector 70' is connected to pilot fuel rail 72' and pilot fuel is supplied to pilot fuel rail 72' from pilot fuel supply system 74', which includes pilot fuel pump 76' and pilot fuel storage tank 78'. Main fuel injector 70" is connected to main fuel rail 72" and main fuel is supplied to main fuel rail 72" from main fuel supply system 74", which includes main fuel pump 76" and main fuel storage tank 78". In FIG. 1 pilot fuel injector 70' and main fuel injector 70" are shown in separate bodies, but as shown in FIG. 3, the two injectors can be integrated into a single body. In the illustrated embodiments, because the main fuel is injected directly into the respective combustion chambers, at least some of the main fuel can be injected after the respective intake valves are closed, with the timing being determined to prevent, or at least reduce the chance of, the formation of a combustible mixture that ignites prematurely to cause engine knock.

During a normal operating mode, a normal injection mode is employed, with the total fueling delivered to each cylinder 10 comprising a pilot fuel quantity A and a main fuel quantity B with substantially the same amount of fuel and with substantially the same timing for each cylinder for the various operating conditions. In preferred embodiments, the pilot fuel comprises a diesel fuel, preferably in a range of approximately 5% of the total fueling, measured on an energy basis. The main fuel can comprise compressed natural gas, preferably in a range of approximately 95% of the total fueling, measured on an energy basis. While the illustrated engine system has six cylinders, it will be appreciated that other engine systems with a plurality of combustion chambers can benefit from this method. In the illustrated example, with a six-cylinder engine, a normal injection mode during a normal operating mode comprises modulating a predetermined minimum pilot fuel quantity and modulating a main fuel quantity for each of the six cylinders at a ratio that maintains a requisite engine power.

Engine system 100 comprises feedback control system 200 in electronic communication with the fuel injection system. Feedback control system 200 is adapted to detect whether engine system 100 is experiencing a predetermined low load condition associated with a skip-fire injection mode. When a predetermined low load is detected feedback control system 200 determines and selects at least one combustion chamber of the plurality of combustion chambers associated with cylinders 10 that is designated for skip-firing during a next cycle. The feedback control system 200 skip-fires the selected at least one combustion chamber for a given duration and then determines whether engine system 100 is continuing to experience the low load condition during the given duration. If engine system 100 is still experiencing the low load condition, then feedback control system 200 repeat determining and selecting at least one combustion chamber of the plurality of combustion chambers to skip-fire during the next cycle. If engine system 100 is not experiencing the low load condition, feedback control system 200 returns the plurality of combustion chambers to a normal injection mode.

Feedback control system 200 can control pilot fuel injector 70' independently from its control of main fuel injector 70" so that the timing for injection of each fuel and the quantity of each fuel injected can be determined to achieve the desired combustion characteristics and increase the DSF. Because each fuel injector is individually controlled, feedback control system 200 can be programmed to follow a predetermined cycle-by-cycle skip-firing pattern that reduces vibrations and avoids harmonic frequencies when selecting at least one combustion chamber of the plurality of combustion chambers that is designated for skip-firing.

While the skip-fire operation mode can cause irregular structural loading of engine components such as the pistons and the crankshaft(s); these effects are minimized, or at least reduced, at low loads and have less influence on engines that have a greater number of cylinders. In preferred embodiments, the main fuel comprises a gaseous fuel, such as natural gas, that can be stored as liquefied natural gas (LNG) or compressed natural gas (CNG); and the pilot fuel comprises diesel fuel. The given duration for the skip-fire injection mode comprises a switching period having sufficient time for facilitating detecting and selecting the at least one combustion chamber for skip-fire during the next cycle.

Figure 2A:
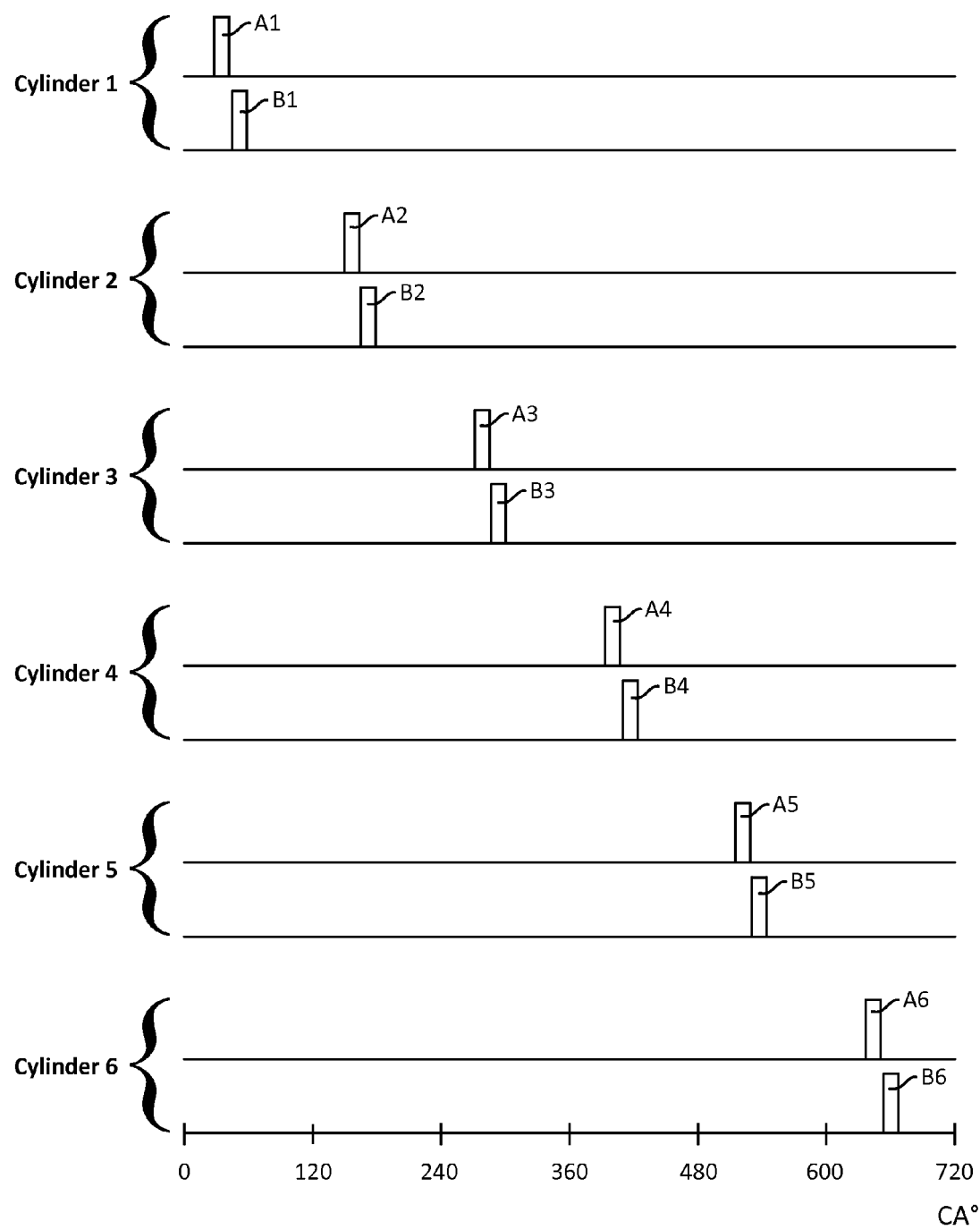
FIG. 2A is a graph illustrating command signals over time for injection fuel into a combustion chamber for a low load operation mode of an engine system without a skip-fire fuel-injection operation mode.
Figure 2B:
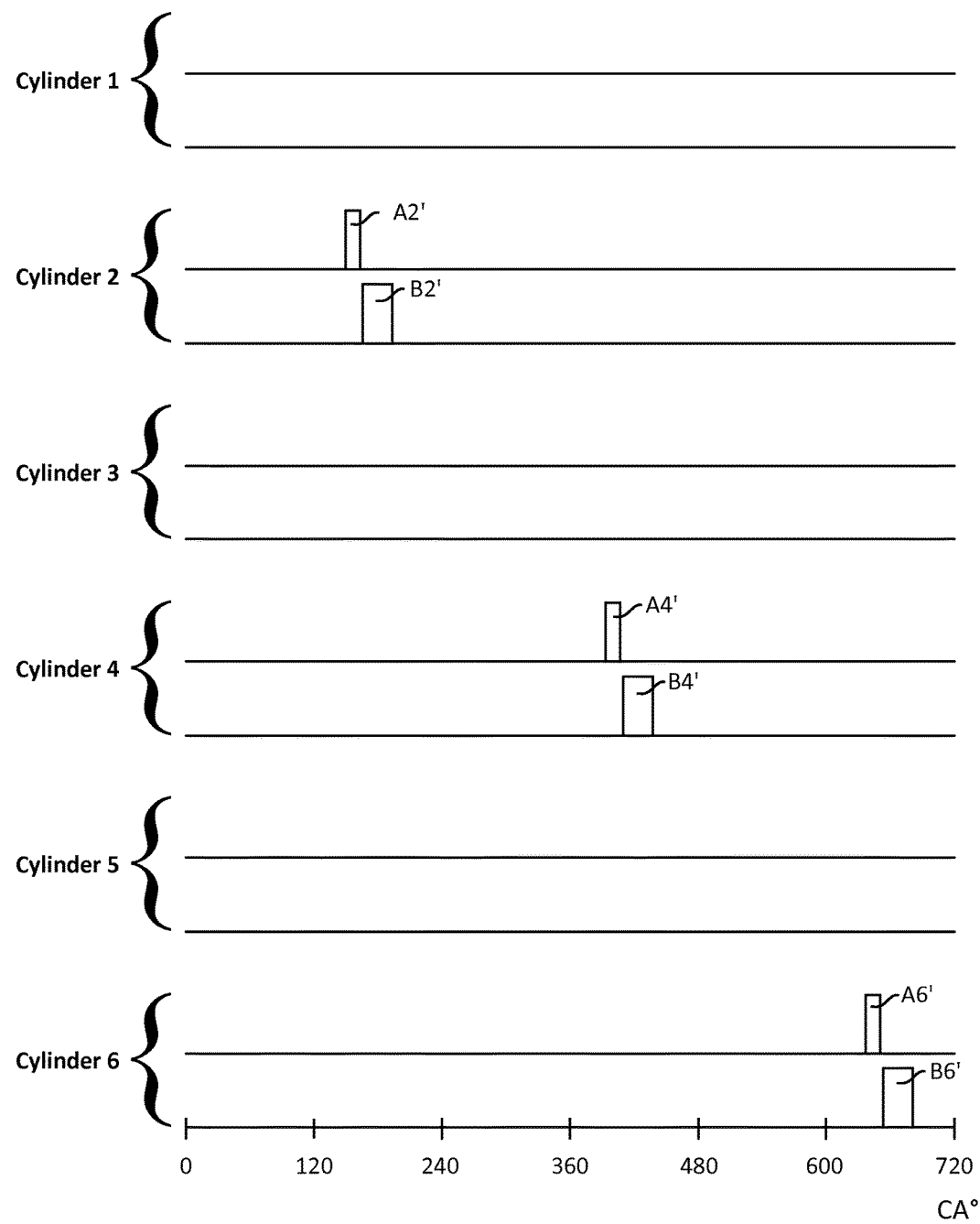
FIG. 2B is a graph illustrating command signals over time for injecting fuel into a combustion chamber for a low load operating mode with a skip-fire fuel-injection operation mode of an engine system.

FIGS. 2A and 2B illustrate how the disclosed skip-fire technique increases the pilot fuel substitution factor, resulting in reduced overall pilot fuel consumption. FIG. 2A shows the injector command signals for a six cylinder engine system operated without skip-firing. The cylinder numbers along the left hand side of the figure represent cylinder firing order. Over the same time scale, indicated by crank angle degrees, for each cylinder there is a respective command signal for the pilot fuel, $A_1$, $A_2$, $A_3$, $A_4$, $A_5$ and $A_6$, and a respective command signal for the main fuel, $B_1$, $B_2$, $B_3$, $B_4$, $B_5$ and $B_6$. Because a minimum quantity of pilot fuel is needed for stable combustion, at lower load conditions there is a minimum amount of pilot fuel that is delivered to the pilot fuel injectors when the six cylinders are firing in a normal operating mode. FIG. 2B shows the injector command signals for the same six cylinder engine operated with skip-firing. In this example, no fuel is delivered to half of the cylinders ($A_2'$, $A_4'$ and $A_6'$) so while the same minimum amount of pilot fuel is injected into each cylinder, pilot fuel consumption is reduced by half, and the main fuel $B_2'$, $B_4'$ and $B_6'$ can be increased to the cylinders that are firing to make up the energy requirement to satisfy the demanded engine load. In this way, the engine system is operable using a lower ratio of the pilot fuel to a total fuel quantity measured on an energy basis at predetermined low load conditions compared to the same engine system when operated without employing a skip-fire operating mode. Like the pilot fuel injectors, with the main fuel injectors there is also a lower limit on the amount of fuel that can be consistently injected so increasing the amount of main fuel that is injected into each combustion chamber using the skip-fire technique also helps to improve combustion stability.

Using the disclosed skip-fire technique and increasing DSF at low load helps to improve the overall DSF. During operation over a range of engine loads for a typical operating cycle for engines used to power a vehicle, with the skip-fire technique, the pilot fuel comprises approximately 5% or less of a total fueling measured on an energy basis. The main fuel comprises approximately 95% or more of a total fueling measured on an energy basis. Under certain predetermined load conditions, the engine system can be operable in a mode when the pilot fuel is the only fuel consumed by the engine system. During skip-firing operating mode different patterns for cylinder firing can be employed such that over time all cylinders are fired. It is desirable to eventually fire each cylinder during skip-firing operating mode so diesel accumulation in the injector is reduced. Due to the pressure differential between gas and diesel, diesel accumulation in the injector causes the diesel to flow into the gas rail. For example, during one engine cycle cylinders 1, 3 and 5 can be fired, and during the next engine cycle cylinders 2, 4 and 6 can be fired. It is not a requirement that the cylinders to be fired are changed from engine cycle to engine cycle.

FIG. 3 is cross-sectional view of one cylinder of skip-fire fuel-injection engine system 100 (see FIG. 1) that comprises a plurality of cylinders, suitable for use in a skip-fire operation mode. By example only, engine system 100 generally comprises: cylinder 10 formed by cylinder walls 24 of engine block 25; piston 20 mechanically and rotatably coupled with a piston rod (not shown) by way of a pin (not shown) disposed through opening 30; intake manifold 40 for delivering air in direction I into combustion chamber 50 by way of operation of intake valve 41; exhaust manifold 60 for delivering exhaust in direction E away from combustion chamber 50 by way of operation of exhaust valve 61; and fuel injector 70, being one component of a fuel injection system, for delivering fuel to the combustion chamber. In the illustrated embodiment, fuel injector 70 is designed to have two injector assemblies in one body for injecting a pilot fuel, such as a diesel pilot, and a main fuel, such as natural gas. In preferred embodiments fuel injector 70 can comprise concentric needles with one needle controlling the injection of the pilot fuel and another needle controlling the injection of the main fuel. In another embodiment, the fuel injector can inject the pilot fuel and the main fuel together. In yet other embodiments (not shown) for engines with more space to accommodate other arrangements, there can be two separate injection valve assemblies in the same body (for example, side by side and parallel to each other), or (as shown in FIG. 1) two separate fuel injectors each with its own body mounted separately.

Figure 4A:
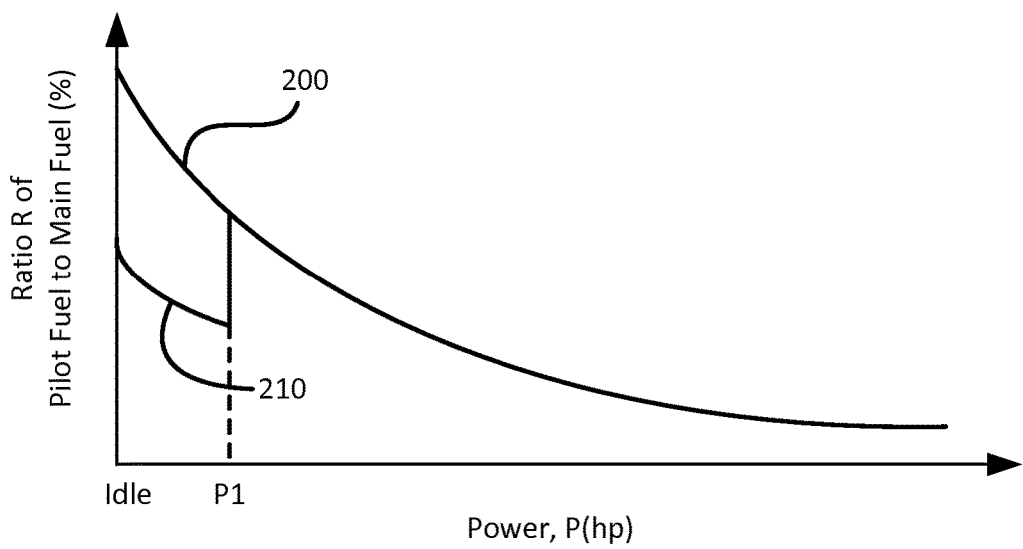
FIG. 4A is a graph illustrating a ratio of pilot fuel to main fuel as a function of power for an engine system.

FIG. 4A is a graph that illustrates a ratio R of pilot fuel to main fuel (%) as a function of power P (hp) for an engine system utilizing skip-fire, compared to the same data for an engine system operating under the same conditions but without using skip-fire. When engine system 100 is operating near idle at low power the quantity of pilot fuel consumed relative to main fuel increases, since a minimum quantity of pilot fuel is required for ignition. Line 200 represents the ratio R as a function of power for engine system 100 not operating in skip fire mode, and line 210 represents the same relationship when engine system 100 switches to skip fire mode at powers below P1. As can be seen by line 210, skip-firing operating mode reduces the ratio of pilot fuel to main fuel, thereby improving DSF.

Figure 4B:
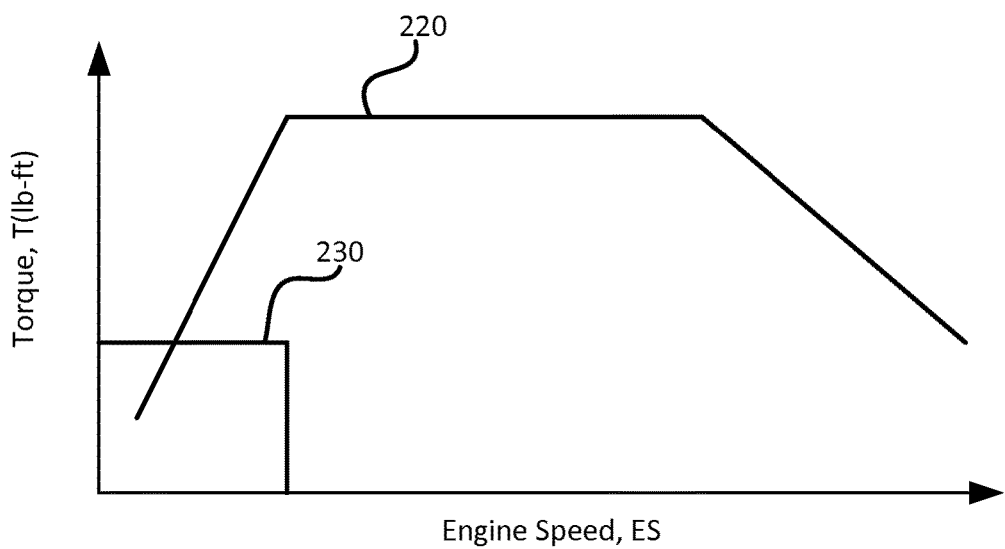
FIG. 4B is a graph illustrating torque as a function of engine speed for an engine system.

Referring to FIG. 4B, this graph illustrates torque T as a function of engine speed ES (rpm) for an engine system utilizing skip-fire, compared to the same data for an engine system operating under the same conditions but without using skip-fire. Engine system 100 operates in skip-fire mode in region 230, representing a low load region of engine operation below line 220 representing torque T as a function of engine speed ES.

Figure 5:
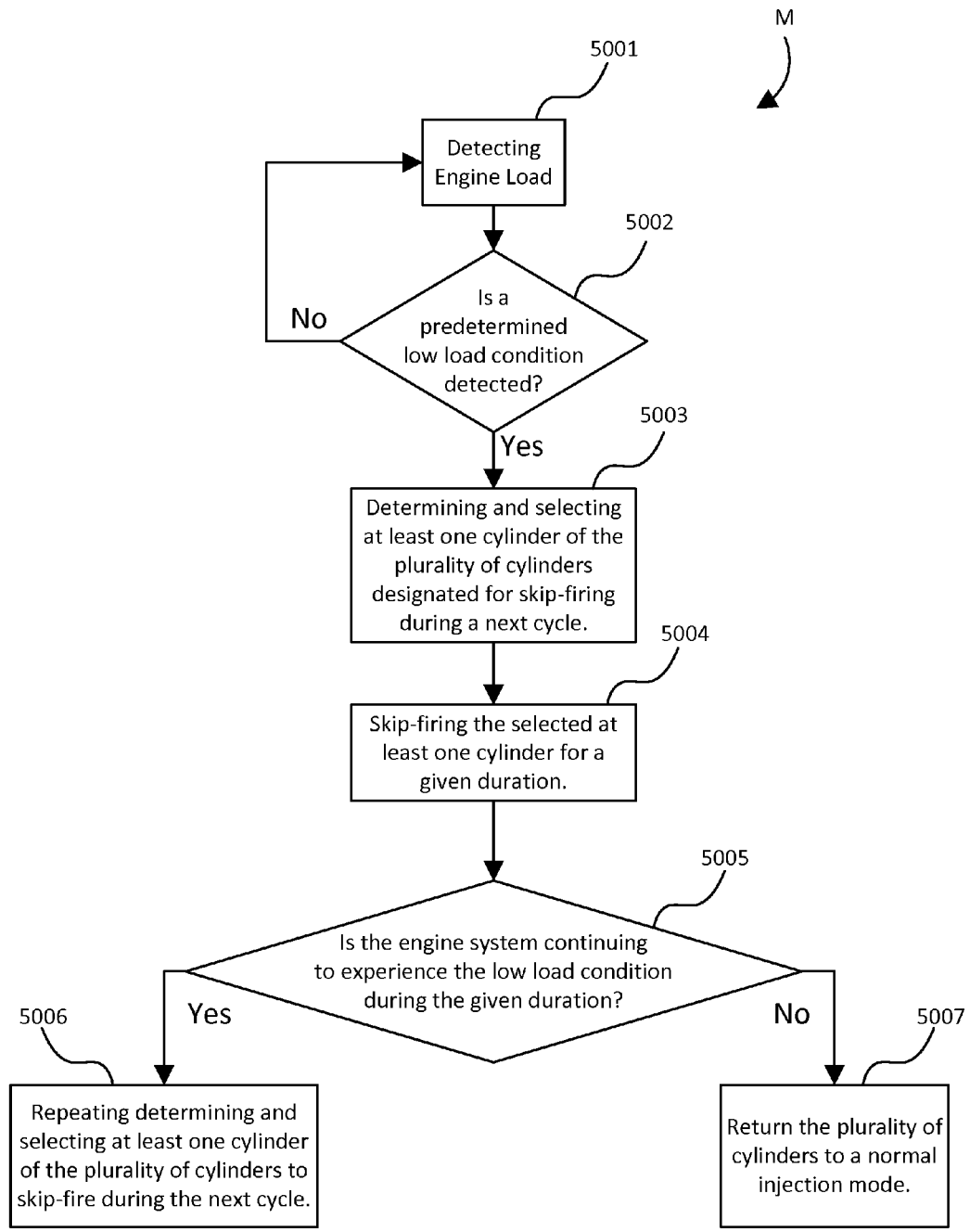
FIG. 5 is a flowchart illustrating a skip-fire fuel-injection method.

FIG. 5 is a flowchart illustrates method M for skip-firing an engine system such as the one shown in FIG. 1, the engine system having a plurality of cylinders and a fuel-injection system, and the engine system being operable with a main fuel and a pilot fuel. In particular, the present skip-fire strategy comprises a cycle-by-cycle skip-firing pattern (combustion chambers are selectively skipped per cycle) which reduces the formation of harmonic frequency vibrations in the engine system; and, when used in combination with direct fuel injection or direct injection (both pilot fuel and main fuel being delivered directly into the combustion chamber or a pre-chamber after the intake valve closes by way of a direct injector), injection timing is selected to trigger ignition at the desired time, preventing, or at least reducing the chance of, premature ignition and engine knock. In addition, the present cycle-by-cycle skip-firing pattern further comprises a switching duration during a given cycle which provides a sufficient time period for determining which combustion chambers to skip for the subsequent cycle.

Skip-fire method M for skip-firing an engine system comprises: detecting engine load, as indicated by block 5001; determining when the predetermined low load condition is detected, as indicated by block 5002; when the predetermined low load condition is detected, determining and selecting at least one combustion chamber of the plurality of combustion chambers designated for skip-firing during a next cycle, as indicated by block 5003; skip-firing the selected at least one combustion chamber for a given duration, as indicated by block 5004; determining whether the engine system continues experiencing the low load condition during the given duration, as indicated by block 5005; and, if so, repeating determining and selecting at least one combustion chamber of the plurality of combustion chambers to skip-fire during the next cycle, as indicated by block 5006, and if not, returning the plurality of combustion chambers to a normal injection mode, as indicated by block 5007, thereby increasing a pilot fuel substitution factor and reducing an overall pilot fuel consumption.

In preferred embodiments method M for skip-firing an engine system further comprises delivering at least some of the main fuel into a combustion chamber after closing of an associated intake valve, whereby a timing for delivery of at least some of the main fuel is selected to prevent, or at least reduce the chance of, premature ignition; delivering the at least some of the main fuel and the pilot fuel into the combustion chamber through a fuel injection system; controlling timing for delivery of the pilot fuel independently from timing for delivery of at least some of the main fuel; and injecting the pilot fuel into the combustion chamber separately from the main fuel.

In method M for skip-firing an engine system, selecting at least one combustion chamber of the plurality of combustion chambers designated for skip-firing further comprises following a predetermined cycle-by-cycle skip-firing pattern that reduces formation of harmonic frequency vibrations in the engine system. The main fuel comprises a gaseous fuel, such as natural gas. The pilot fuel comprises diesel fuel. The given duration comprises a switching period having sufficient time for facilitating detecting and selecting at least one combustion chamber for skip-fire during the next cycle. The engine system is operable using a lower ratio of the pilot fuel to a total fuel quantity measured on an energy basis at the predetermined low load condition compared to the same engine system when operated without skip-firing. With some engines that use a pilot fuel to ignite a main fuel, when the engine load decreases below a predetermined level, at which the minimum pilot fuel amount provides all of the requisite energy to deliver the commanded load, the amount of main fuel is reduced to zero. By using the disclosed skip-fire operating mode, the amount of time that an engine is fuelled only with pilot fuel is reduced because the skip-fire operating mode extends the range of operation at low operating loads where the main fuel provides at least some of the energy required to deliver the demanded engine load. In preferred embodiments, by using a skip-fire operating mode, overall pilot fuel consumption can be reduced, so that the pilot fuel comprises approximately 5% or less of a total fueling measured on an energy basis. The main fuel comprises approximately 95% or more of a total overall fueling measured on an energy basis. Under certain predetermined load conditions, the engine system can still be operable in a mode when the pilot fuel is the only fuel consumed by the engine system, but the range of these conditions is reduced compared to the same engine that does not use a skip-fire operating mode.

Figure 6:
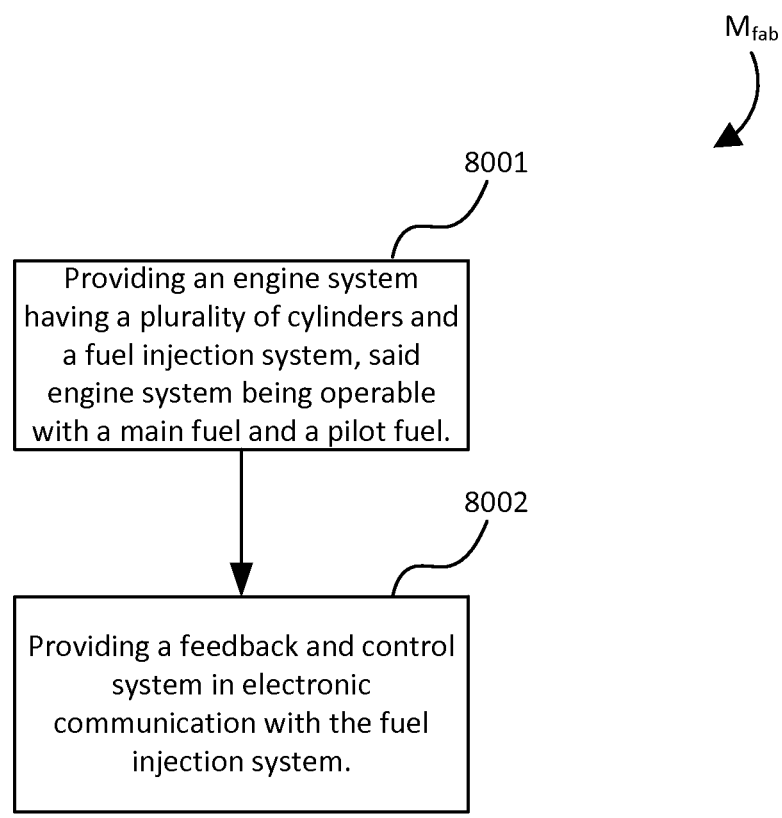
FIG. 6 is a flowchart illustrating a method of fabricating an engine system.

FIG. 6 is a flowchart illustrating method $M_{fab}$ of fabricating a skip-fire fuel-injection engine system. Method $M_{fab}$ comprises: providing engine system 100 having a plurality of combustion chambers 50 and a fuel injection system, engine system 100 being operable with a main fuel and a pilot fuel, as indicated by block 8001; and providing a feedback and control system in electronic communication with the fuel injection system, as indicated by block 8002. The feedback and control system 200 is adapted to: detect whether engine system 100 is experiencing a predetermined low load condition associated with a skip-fire injection mode; when the predetermined low load is detected, determine and select at least one combustion chamber 50 of the plurality of combustion chambers 50 designated for skip-firing during a next cycle; skip-fire the selected at least one combustion chamber 50 for a given duration; determine whether engine system 100 continues experiencing the low load condition during the given duration; and, if so, repeat determining and selecting at least one combustion chamber 50 of the plurality of combustion chambers 50 to skip-fire during the next cycle, and if not, return the plurality of combustion chambers 50 to a normal injection mode, whereby a pilot fuel substitution factor is increased, and whereby overall pilot fuel consumption is reduced.

In method $M_{fab}$, feedback and control system 200 is further adapted to: deliver at least some of the main fuel into a combustion chamber 50 after closing of intake valve 41, such as an associated intake valve, whereby a timing for delivery of the at least some of the main fuel is selected to prevent, or at least reduce the chance of, premature ignition; deliver at least some of the main fuel and the pilot fuel into combustion chamber 50 through a fuel injection system, such as integrated pilot and main fuel injector 70; control timing for delivery of the pilot fuel independently from the timing for delivery of at least some of the main fuel; inject the pilot fuel into combustion chamber 50 separately from the main fuel; and follow a predetermined cycle-by-cycle skip-firing pattern that reduces formation of harmonic frequency vibrations in engine system 100 when selecting at least one combustion chamber 50 of the plurality of combustion chambers 50 designated for skip-firing.

In method $M_{fab}$, the main fuel can comprise a gaseous fuel, such as natural gas. The pilot fuel can comprise diesel fuel. The given duration comprises a switching period having sufficient time for facilitating detecting and selecting at least one combustion chamber for skip-fire during the next cycle. The engine system is operable using a lower ratio of the pilot fuel to a total fuel quantity measured on an energy basis at the predetermined low load condition compared to the same engine system when operated without skip-firing. The pilot fuel can comprise approximately 5% or less of a total fueling measured on an energy basis. The main fuel can comprise approximately 95% or more of a total fueling measured on an energy basis. Under certain predetermined load conditions, the engine system is operable in a mode when the pilot fuel is the only fuel consumed by the engine system with the range of these conditions being reduced compared to an otherwise equivalent engine that does not have a skip-fire operating mode.

The fuel injection system comprises a fuel injection assembly for injecting a pilot fuel and a main fuel. In some embodiments, this fuel injection assembly has one body, comprising a nozzle for injecting the two fuels directly into the engine's combustion chamber. In preferred embodiments the fuel injection assembly comprises two separate and independently operable fuel injection valves, one for the pilot fuel and one for the main fuel. These two fuel injection valves can be concentric or parallel (side by side) in the same body of the fuel injection assembly (as depicted in FIG. 3). When there are two separate fuel injection valves, because of the different mass densities of the two fuels, preferably, there are two sets of orifices so the flow area through the orifices can be made to accommodate the desired flow rate of each fuel. In other embodiments, if the engine has sufficient space to mount two separate fuel injection valves, the fuel injection assembly can comprise two separate fuel injection valves, each housed in its own body (as shown in FIG. 1). In yet another embodiment, the fuel injection assembly can comprise at least one fuel injection valve that injects one of the two fuels into a pre-chamber. Unlike in a dual fuel engine where one of the fuels is injected into the intake air and then enters the combustion chamber with the intake air through the engine intake valve, with the subject fuel injection assembly, after the engine intake valve is closed, both the pilot fuel and the main fuel can be injected through the fuel injection assembly into the combustion chamber either directly into the combustion chamber or indirectly through a pre-chamber.

Injection of the two fuels through such a fuel injection assembly requires the fuels to be raised to injection pressures sufficient to overcome the late-cycle in-cylinder pressure, which is higher than the air pressure in the intake air manifold and intake ports. The advantages of such high-pressure direct-injection engine systems include reduced tendency for engine knock, enabling higher compression ratios, and no displacement of intake air by fuel. Accordingly, high-pressure direct-injection is defined to refer to systems that use a fuel injection assembly such as the embodiments described herein.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of skip-firing an engine system wherein said engine system comprises a plurality of combustion chambers and a fuel-injection system configured to directly inject a gaseous main fuel into each of said combustion chambers and a different pilot fuel for triggering combustion of said gaseous main fuel, whereby said fuel-injection system is capable of injecting said main fuel into said combustion chamber after an associated air intake valve is closed, said steps of said method comprising:
   (a) detecting when said engine system is experiencing a predetermined low load condition for applying a skip-fire injection mode;
   (b) determining and selecting at least one combustion chamber of said plurality of combustion chambers designated for skip-firing during a next cycle;
   (c) skip-firing said selected at least one combustion chamber for a given duration;
   (d) determining whether said engine system continues experiencing said low load condition during said given duration;
   wherein said engine system is configured to change a ratio of said pilot fuel to a total fuel quantity measured on an energy basis at said predetermined low load condition when operated with skip firing compared to said same engine system when operated without skip-firing and wherein the predetermined low load condition is met when an injector lower limit is reached for consistently directly injecting an amount of fuel.

2. The method of claim 1, wherein when said engine system is not experiencing said low load condition during said given duration the method further comprises;
   (e) returning said plurality of combustion chambers to a normal injection mode.

3. The method of claim 1, further comprising:
   (e) injecting at least some of said main fuel and said pilot fuel into said combustion chamber after closing of an associated intake valve, whereby timing for delivery of said at least some of said main fuel is selected to be late cycle to prevent premature ignition.

4. The method of claim 1, further comprising
   (e) separately injecting at least some of said main fuel and said pilot fuel into said combustion chamber after closing of an associated intake valve through one body of a fuel injection assembly, whereby timing for delivery of said at least some of said main fuel is selected to be late cycle to prevent premature ignition.

5. The method of claim 1, wherein said selecting at least one combustion chamber of said plurality of combustion chambers designated for skip-firing involves following a predetermined cycle-by-cycle skip-firing pattern that reduces undesirable vibrations in said engine system.

6. The method of claim 1, wherein said pilot fuel comprises diesel fuel.

7. The method of claim 1, wherein said given duration comprises a switching period having sufficient time for facilitating detecting and selecting said at least one combustion chamber for skip-fire during the next cycle.

8. The method of claim 1, wherein said engine system is configured to inject the ratio as a lower ratio of said pilot fuel to said total fuel quantity measured on an energy basis at said predetermined low load condition when operated with skip firing compared to said same engine system when operated without skip-firing.

9. The method of claim 1, wherein, under certain predetermined load conditions, said engine system is operable in a mode when said pilot fuel is the only fuel consumed by said engine system; and further comprising reducing an amount of time that said engine system is fuelled only with said pilot fuel by applying said skip-fire injection mode.

10. A skip-fire fuel-injection engine system, comprising:
    (a) an engine system configured to use a gaseous main fuel and a different pilot fuel for triggering combustion of said gaseous main fuel, wherein said engine system comprises:
        (i) a plurality of combustion chambers; and
        (ii) a fuel injection system for directly injecting said main fuel and said pilot fuel into each of said combustion chambers whereby said fuel injection system is capable of injecting said main fuel into said combustion chamber after an associated air intake valve is closed,
    (b) a programmable electronic feedback and control system in communication with said fuel injection system, said programmable electronic feedback and control system configured to:
        (i) detect when said engine system is experiencing a predetermined low load condition associated with a skip-fire injection mode;
        (ii) when said predetermined low load is detected, determine and select at least one combustion chamber of said plurality of combustion chambers designated for skip-firing during a next cycle;
        (iii) skip-firing said selected at least one combustion chamber for a given duration;
        (iv) determine whether said engine system continues experiencing said low load condition;
    wherein said engine system is configured to change a ratio of said pilot fuel to a total fuel quantity measured on an energy basis at said predetermined low load condition when operated with skip firing compared to said same engine system when operated without skip-firing and wherein the predetermined low load condition is met when an injector lower limit is reached for consistently directly injecting an amount of fuel.

11. The system of claim 10, wherein said programmable electronic feedback and control system is further configured to:
    (v) deliver at least some of said main fuel into a combustion chamber after closing of an associated intake valve, whereby timing for delivery of said at least some of said main fuel is selected to be late cycle to prevent premature ignition; and
    (vi) control timing for delivery of said pilot fuel independently from said timing for delivery of said at least some of said main fuel.

12. The system of claim 10, wherein said pilot fuel on average comprises less than 5% of a total fueling measured on an energy basis.

13. The system of claim 10, wherein said given duration comprises a switching period having sufficient time for facilitating detecting and selecting said at least one combustion chamber for skip-fire during the next cycle.

14. The system of claim 10, wherein said engine system is configured to inject the ratio as a lower ratio of said pilot fuel to said total fuel quantity measured on an energy basis at said predetermined low load condition when operated with skip-firing compared to said same engine system when operated without skip-firing.

15. The system of claim 10, wherein, said engine system is operable in a mode when said pilot fuel is the only fuel consumed by said engine system and said programmable electronic feedback and control system is further configured to reduce an amount of time that said engine system is fuelled only with said pilot fuel by applying said skip-fire injection mode.

16. The system of claim 10, wherein said programmable electronic feedback and control system is further configured to deliver at least some of said main fuel into a combustion chamber after closing of an associated intake valve through one body of a fuel injection assembly, whereby timing for delivery of said at least some of said main fuel is selected to be late cycle to prevent premature ignition; and said one body of said fuel injection assembly comprises a first fuel injection valve that is operable to inject said pilot fuel independently from a second fuel injection valve that is operable to inject said main fuel; and said fuel injection assembly comprises a concentric needle injector, with said first injection valve having a needle concentric with a needle of said second injection valve.

17. A method of fabricating a skip-fire fuel-injection engine system, comprising:
(a) providing an engine system having a plurality of combustion chambers and a fuel injection system, said engine system being operable for directly injecting a gaseous main fuel and a different pilot fuel for triggering combustion of said gaseous main fuel whereby said fuel injection system is capable of injecting said main fuel into said combustion chamber after an associated air intake valve is closed; and
(b) providing a programmable electronic feedback and control system in electronic communication with said fuel injection system, said programmable electronic feedback and control system configured to:
(i) detect when said engine system is experiencing a predetermined low load condition associated with a skip-fire injection mode;
(ii) when said predetermined low load is detected, determine and select at least one combustion chamber of said plurality of combustion chambers designated for skip-firing during a next cycle;
(iii) skip-fire said selected at least one combustion chamber for a given duration;
(iv) determine whether said engine system continues experiencing said low load condition during said given duration;
wherein said engine system is configured to change a ratio of said pilot fuel to a total fuel quantity measured on an energy basis at said predetermined low load condition when operated with skip firing compared to said same engine system when operated without skip-firing and wherein the predetermined low load condition is met when an injector lower limit is reached for consistently directly injecting an amount of fuel.

18. The method of claim 17, wherein said programmable electronic feedback and control system is further configured to:
(v) deliver at least some of said main fuel into a combustion chamber after closing of an associated intake valve, and whereby timing for delivery of said at least some of said main fuel is selected to be late cycle to prevent premature ignition; and control timing for delivery of said pilot fuel independently from said timing for delivery of said at least some of said main fuel.

19. The method of claim 17, wherein said programmable electronic feedback and control system is further configured to follow a predetermined cycle-by-cycle skip-firing pattern that reduces formation of harmonic frequency vibrations in said engine system when selecting at least one combustion chamber of said plurality of combustion chambers designated for skip-firing.

* * * * *